Sept. 12, 1961 J. D. GROVES 2,999,733
CHLORINATION PROCESSES
Filed Jan. 16, 1958
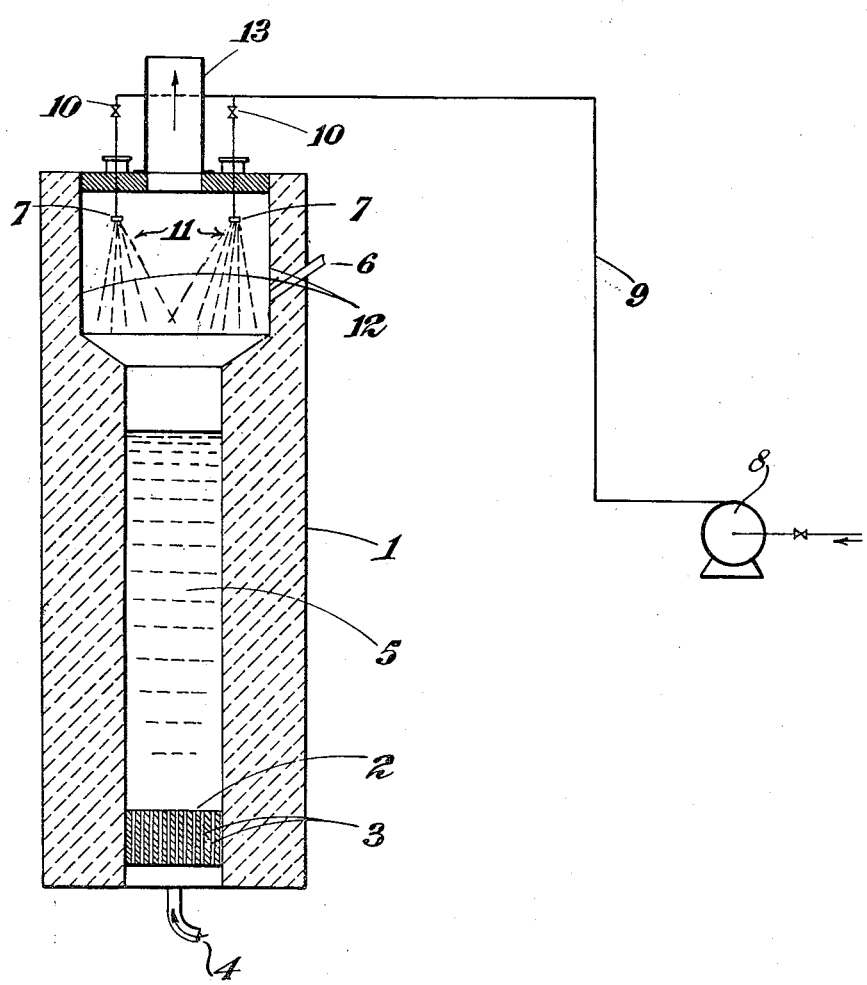
INVENTOR
JAMES DENNIS GROVES
ATTORNEY

2,999,733
CHLORINATION PROCESSES

James Dennis Groves, Fairfield, Stockton-on-Tees, England, assignor to British Titan Products Company Limited, Billingham, England, a company of Great Britain
Filed Jan. 16, 1958, Ser. No. 709,229
Claims priority, application Great Britain Jan. 16, 1957
12 Claims. (Cl. 23—87)

This invention has for its object to overcome problems of blocking or plugging of a chlorinator and its exit ducting during the chlorination of titaniferous ores.

Various processes have been described for the chlorination of titaniferous ores and the more favoured processes are those employing a shaft furnace in which the titaniferous material is fed, admixed with a reducing agent, either in the form of briquettes, or as a loose admixture into a bed which is fluidised. The chlorine passes upward through the mass which is maintained at temperatures of the order of 800 to 1200° C.

Whilst in many processes the selected titaniferous material for chlorination is mineral rutile, there are economic reasons which lead to the desire to chlorinate other titaniferous minerals of which ilmenite is a particular example. The titaniferous materials normally employed may contain from 30 to 99% $TiO_2$.

The impurities associated with these minerals are many and vary considerably in their proportions. The most common impurity is iron which may exist in the mineral both in ferrous and ferric state. Other impurities which are frequently present are zirconium, aluminum, magnesium, manganese, niobium and silicon. All these impurities will chlorinate, together with the titanium, to a greater or less extent under the conditions existing in the normal type of chlorinator, but the products obtained thereby may vary considerably in their properties. Thus, for instance, titanium and silicon produce chlorides which will normally condense at room temperatures to liquids. On the other hand, many of the other chlorides produced are solid at room temperature.

As regards the iron impurities, in the older processes, due to a large extent to the inefficiency in the utilisation of chlorine, the gases produced in the chlorinator contained iron mainly as ferric chloride. If there were substantial quantities of chlorine in the exit gases it is unlikely that there would be appreciable quantities of ferrous chloride since these would react. When, however, the chlorine content in the gases is low, appreciable quantities of ferrous chloride may be present.

Under the partial pressures which normally exist in the chlorination gases ferric chloride vapour condenses directly to the solid, i.e. it desublimes. On the other hand, iron chloride in the ferrous state condenses at higher temperatures, i.e. at temperatures above 600° C. and initially it will condense to the liquid state. The normal melting point of ferrous chloride is about 670° C. and the boiling point has frequently been estimated as approximately 1100° C. Under the partial pressures in which it exists in the chlorinator, it may be expected to condense at temperatures variable between 1050 and 400° C., and it could, under certain conditions, form liquid mixtures of melting point lower than the melting point of pure ferrous chloride.

Another impurity which is particularly prevalent in ilmenite ores is magnesium, which may be present, for instance, in an average Indian sand to the extent of approximately 0.5 to 2% of MgO. On the other hand, in other forms of ilmenite, magnesium may be found in contents of the order of 4 to 5% MgO or more. This magnesium content undergoes chlorination whilst chlorinating a titaniferous ore and the magnesium chloride generated from ilmenite ex Quilon, India, may have a dew point of 890° C. and this may well introduce tackiness on the upper walls of the furnace, or in the succeeding ducting.

The various gases (the word "gases" being understood as including vapours) may leave the chlorination bed at temperatures of the order of 800 to 1200° C. varying according to the conditions under which the process is conducted, e.g. the extent of thermal insulation of the chlorinating chamber or furnace, the rate of admission of the reactants, and the temperature of the reactants admitted therein. Lowering of temperature may be effected by withdrawal of a portion of the bed, cooling and subsequently recirculating back to the furnace the cooled portion so withdrawn. Regulation by either heating or cooling may be effected by admission of various gases, such as inert gases for cooling, or of gases such as oxygen-containing gases for auxiliary heating i.e. by reaction with the carton content of the bed. A further and eminently suitable method of lowering temperature is by injection into the bed of either liquids or solids which by vapourisation within the bed will effect cooling thereof. An illustration of this is to be found in United States application, Serial No. 564,867, now U.S. Patent 2,868,-622, wherein titanium tetrachloride as liquid or ferric chloride as solid may be admitted into the bed for controlled cooling.

The gases leaving the bed will variably undergo some cooling by incidental radiation of heat to the walls of the furnace or of pipes and vessels leading therefrom, or they may be cooled by countercurrent flow through them of cold or cooled ore being fed to the bed. They may also be cooled in the ducting or in subsequent vessels by contacting cooling surfaces. Alternatively they may be cooled by more direct means to room temperature or to various intermediate temperatures as, for instance, to a temperature just above the point at which the normally solid constituents, e.g. ferric chloride, condense, or to a point just above the dew point of the major constituent titanium tetrachloride. Such more direct processes are conducted by a variety of means amongst which is admission by spraying of the liquid titanium tetrachloride into the hot gases in the ducting or in subsequent vessels. These methods, although quite suitable for the handling of gases wherein, for instance, the iron constituent is mainly in the ferric state, or gases which do not contain a high proportion of halides of the type of magnesium chloride, are, however, inadequate to meet with the situation where these constituents appear in relatively large quantities in that they do not assist in any way to inhibit the build-up of these undesirable impurities in the ducting leading to the cooling plant or in the upper parts of the chlorinator itself. In cases where choking has occurred, examination of the material causing the obstruction has indicated that it is largely ferrous chloride or mixtures thereof with magnesium chloride. A typical mass of material causing stoppage which had evidently passed through the molten stage before solidifying and which was very hard and adherent to the exit ducting leading immediately from the chlorinator analysed 65% $FeCl_2$, 15% $MgCl_2$.

The characterising feature of the present invention, by which the object stated at the beginning of this specification is achieved, resides in chilling the gases as they leave the hot chlorination bed to a temperature below 700° C. preferably below 500° C., i.e., low enough to cause precipitation as solids, in the gas stream, of the metal chlorides which are solid at a temperature of 300° C., so that such of these metal chlorides as pass into the solid state through a liquid phase will primarily do so in the gas stream and not in contact with upper walls of the chlorination chamber or with walls of the exit ducting or of subsequent chambers. Such chilling will normally involve bringing the temperature of the gases down to below about 400° C. but above 200° C., preferably 300–400° C., from a temperature which may have been between, say 900 and 1000° C. within 10 seconds after the vapors leave the surface of the bed.

The chilling is preferably effected by thoroughly spraying the gases with a coolant in a region practically immediately above the chlorination bed. The preferred coolants are titanium tetrachloride, silicon tetrachloride, tin tetrachloride and/or other normally liquid halide. A sublimable solid, e.g. ferric chloride, may be present in such liquid coolant in the form of a slurry. There may alternatively or additionally be used cool gases which may be gases recycled from a later stage of the chlorination process, e.g. $CO_2$ and $CO$.

The invention is applicable to various methods of chlorination, such as, for instance, the process employing briquettes, but it is particularly adaptable to a process embodying the fluid bed techniques as exemplified in British Patents No. 724,193 and No. 762,583. While applicable to the chlorination of various titanium ores including mineral rutile, it is particularly adaptable to the chlorination of ferro-titaniferous minerals, such as ilmenite or slags or other materials resulting from the removal of part of the iron content of the original ore.

Ilmenite ores are obtainable from various parts of the world and vary considerably in regard to their titanium oxide content and to a corresponding extent particularly with reference to the proportion of their iron constituents and especially in regard to the proportion of ferrous to ferric iron. Other impurities exist in these ilmenites as will be readily appreciated. Thus, one ore, mentioned by way of example, is a high grade variety of ilmenite ore obtainable from Quilon, India, having the following approximate analysis:

|  | Percent |
|---|---|
| $TiO_2$ | 60.2 |
| $MnO$ | 0.38 |
| $MgO$ | 0.84 |
| $FeO$ | 10.0 |
| $Cr_2O_3$ | 0.22 |
| $P_2O_5$ | 0.1 |
| $Fe_2O_3$ | 25.0 |
| $V_2O_5$ | 0.62 |

In the chlorination of this ore by the fluid bed process, substantially the whole of the ilmenite is completely chlorinated, with the possible exception of dust resulting from the diminution in size of the sand or grains consequent upon chlorination becoming so light as to be gas borne and thereby transported in the gas stream out of the furnace. Chlorination of the individual constituents of the ore may often be non-selective, that is to say there is essentially no requirement for preferential chlorination of one constituent from another. Furthermore, in the fluid bed process, particularly a process as described in, for instance, British Patent No. 762,583 in conjuction with United States application of Bennett and Groves, Serial No. 564,867, filed February 13, 1956, now Patent No. 2,868,622, and United States application of Coates and Hayden, Serial No. 565,251, filed February 13, 1956, now Patent No. 2,957,757, the efficiency of chlorination is such that there is no excess of chlorine evolved from the furnace which would effect, for instance, any subsequent oxidation of ferrous chloride emerging from the bed. Thus there is here the problem, as already mentioned, of satisfactorily dealing with the ferrous chloride.

For the purpose of further describing how the invention may be performed, reference will be made to the diagrammatic drawing, which is in sectional elevation:

A shaft furnace 1 is provided at the bottom with a chlorine-distributor block 2 having passageways or tubes 3 for chlorine, admitted at 4, to pass through. The furnace is designed, and the operation thereof conducted, so that chlorine passing through the distributor 2 will proceed through a bed 5 of titaniferous mineral and carbon and bring it in a fluidised condition.

The bed, which is supplied from a solid feed inlet 6, is maintained at temperatures between 800 and 1200° C., preferably between 800 and 1000° C., the temperature being regulated as required by measures such as have already been indicated.

The gases resulting from reaction within the bed will, apart from extraneous gases such as nitrogen or such gases which may result from reaction, i.e. carbon monoxide and carbon dioxide, consist essentially of vapours of titanium tetrachloride, iron chlorides or chlorides of the various other constituents, such as, for instance, ferrous chloride and magnesium chloride. These hot gases emerging from the bed are submitted to exposure of a spray of a liquid coolant, preferably titanium tetrachloride, in such a way that the latter is volatilised within the zone above the bed so as to produce a quick chilling of the gases emerging therefrom. In this way, an adequate quantity of titanium tetrachloride or other suitable coolant will be added so as to chill the gases from temperatures of about 900 to 1000° C., down to about 300 to 400° C. Other suitable coolants may be metal halides such as silicon tetrachloride or tin tetrachloride or solid halides which will evaporate under the conditions existing during chlorination such as ferric or ferrous chloride or solutions or suspensions of such solid halides in liquid halides which may be derived from the condensation of chlorination gasses instead of or in addition to the titanium tetrachloride. Normally, liquid organic halides which do not adversely affect the reaction such as liquid carbon tetrachloride or liquid perchlorethylene in liquid state, can be introduced. However, these materials may be decomposed in the course of reaction. The use of titanium tetrachloride, ferric chloride, or admixtures of these materials is obviously preferable since their removal at a later stage does not constitute an extra operation.

While there are no restrictive controls in the spraying of the titanium tetrachloride, the spray nozzle is located in relation to the bed so that evaporation and, in consequence, cooling, is effected in a zone above the bed, i.e. at least 6 inches and preferably 3 feet above the normal height of the expanded bed. These conditions are determined by temperature recordings. In the drawing there are shown two sprayers 7 supplied by a pump 8, from a storage tank (not shown) for the liquid coolant, through a pipe 9 with branches leading through valves 10 to the respective sprayers. The sprays of liquid coolant which are indicated at 11 intimately encounter the gas stream rising from the bed 5 and, to the extent that they play towards the region near the side walls 12 of the upper part of the shaft furnace 1, which is preferably enlarged, they provide a barrier preventing uncooled gases from impinging on said walls. The arrangement and operation are such that the sprayed liquid evaporates completely before reaching the walls 12 or the fluidized bed below.

In the operation of spraying or cooling or more aptly quenching, the ferrous chloride and magnesium chloride or other similar halides present in the gases which might otherwise condense to the liquid state are substantially cooled rapidly through the stage at which they would normally liquefy and are converted into a solid suspension within the gases and the solid particles which are of the order of $10\mu$ diameter are transported therewith from the furnace through the exit duct 13. The gaseous suspension therefore at a temperature of between 300 and 400° C. or thereabouts is discharged from the top of the shaft furnace chamber to suitable conventional cooling or collecting devices well known to the art.

The following are more detailed examples given for the purpose of further illustrating the invention:

*Example 1*

The shaft furnace 1 is brick-lined and is 18 inches in internal diameter and 8 feet high, enlarged at its upper end to an internal diameter of 3 feet to permit of a further vertical zone of 4 feet. The exit duct 13 of the furnace is 6 inches in diameter for the discharge of the chlorination gases which are then passed into a cyclone and subsequently to cooling apparatus for the removal of solid halides and recovery of liquid titanium tetrachloride.

The passageways in the base plate total 15 in number and are each fitted with a detachable orifice on the under side of the distributor block 2 and a non-return device of the type described in United States application, Serial No. 565,251, now U.S. Patent 2,957,757.

A bed 5 containing 80% of mineral rutile and 20% coke is introduced into the lower shaft of the furnace to a static height of 3 feet. The rutile contains 95% $TiO_2$ and has a mean particle-size of 170 microns, while the coke (98% carbon content) has a mean particle-size of 350 microns. The bed is heated initially to 900° C. whilst admitting air into the furnace through the distributor block 2, by which means it is brought into a fluidised condition. The air supply is then shut off and chlorine is admitted to the bed at the rate of 210 lbs./hour. To maintain the height of the bed a rutile/ilmenite mixture containing 77% $TiO_2$ and 19% iron oxides and having a mean particle-size of 150 microns, is fed into the bed through the inlet 6 at the approximate rate of 140 lbs./hour, together with 30 lbs./hour of coke, graded as above.

A spray of liquid titanium tetrachloride is introduced into the enlarged upper section of the furnace through the spray nozzle 7 at the rate of 230 lbs./hour. Thus, the gaseous products of the reaction are chilled to 400° C. prior to emergence from the furnace.

The gases leaving the reactor have the following composition:

480 lb./hr. $TiCl_4$
32 lb./hr. $FeCl_3$
13 lb./hr. $FeCl_2$
60 lb./hr. $CO_2$
13 lb./hr. CO
3 lb./hr. $MgCl_2 + MnCl_2$
Traces of chlorides of elements such as Cr, V and Al, and less than 1% by volume free $Cl_2$ At the end of two hours' continuous operation, the furnace walls and also the exit port and ducting therefrom for the emergent gases are substantially free from any deposited solid material.

When the process described above was repeated without spraying the emergent gases with liquid titanium tetrachloride, the chlorination gases reached the exit port at an approximate temperature of 700–750° C. The gases leaving the chlorinator had the following composition:

250 lb./hr. $TiCl_4$
32 lb./hr. $FeCl_3$
13 lb./hr. $FeCl_2$
60 lb./hr. $CO_2$
13 lb./hr. CO
3 lb./hr. $MgCl_2 + MnCl_2$
Traces as before, and less than 1% by volume free $Cl_2$ After two hours' chlorination in this manner the run had to be discontinued owing to an accretion of material which comprises mainly ferrous chloride in the exit port and ducting and also on the upper part of the furnace walls.

Example 2

A furnace as described in Example 1, and having a preheated initial bed as described, is fed with 135 lbs. per hour of a rutile/ilmenite mixture of similar analysis admixed with 30 lbs. per hour of coke. This feed is chlorinated by chlorine at the rate of 210 lbs. per hour. Into the gases is sprayed a slurry of titanium tetrachloride containing 2% ferric chloride at the rate of 250 lbs. per hour. This cools the gases to an exit temperature of 400° C. The composition of the gases leaving the furnace is:

| | Lbs./hr. |
|---|---|
| $TiCl_4$ | 430 |
| $FeCl_3$ | 92 |
| $FeCl_2$ | 9 |
| $CO_2$ | 58 |
| CO | 12 |
| $MgCl_2$ and $MnCl_2$ | 4 |

Traces as before $Cl_2 < 1\%$

Example 3

Into a chlorinator furnace as described in Example 1, fed with materials as per Example 2, tail gases from a previous chlorination, i.e. after condensation and removal of chlorides and containing 300 lbs. per hour $CO_2$ and 60 lbs. per hour of CO are injected at a temperature of 20° C. into the hot chlorination gases so that the resultant mixture leaves the furnace at a temperature of 450° C.

Although the present invention has been described with reference to the specific details of certain embodiments, it is not intended that such details shall be regarded as limitations upon the scope of the invention except insofar as they are included in the accompanying claims.

I claim:

1. A method of treating iron-titanium bearing materials which comprises chlorinating the material in a reactor at a temperature above 800° C. and in a chlorination bed having a vapor space above the top of the bed, removing a vapor mixture comprising ferrous chloride and titanium tetrachloride from the top of the bed, and maintaining the temperature of a portion of the vapor space above said bed below 400° C. but above 200° C. whereby to chill the vapors as they are removed from the bed, said portion being spaced from the upper level of the bed thereby forming a solid suspension of ferrous chloride in the vapor and removing the suspension from the reactor.

2. A method of treating an iron-titanium bearing material which comprises establishing a bed of the material in a reactor, said bed having a vapor space above the top level thereof, maintaining the temperature of the bed above 800° C., introducing chlorine into the bed whereby to cause chlorination of the titanium-iron bearing material, maintaining the rate of introduction of chlorine low enough to ensure production of ferrous chloride in vapor state, removing the resulting ferrous chloride and titanium chloride vapors from the surface of the bed, and maintaining the temperature of a portion of the vapor space above the bed below 400° C. but above 200° C., and passing the vapors removed from the bed through said portion of the vapor space, said portion being spaced from the upper level of the bed thereby forming a solid suspension of ferrous chloride in the vapor and removing the suspension from the reactor.

3. A method of treating iron-titanium bearing materials which comprises chlorinating a bed of the material in a reactor at a temperature above 800° C., said bed having a vapor space immediately above the surface of the bed, removing from the surface of the bed a vapor mixture of ferrous chloride and titanium tetrachloride, and chilling the vapors below 400° C. but above 200° C. in said vapor space above the bed before removing the vapor from the reactor, said portion being spaced from the upper level of the bed thereby forming a solid suspension of ferrous chloride in the vapor and removing the suspension from the reactor.

4. The process of claim 3 wherein the vapors are chilled within ten seconds after the vapors leave the surface of the bed.

5. In the chlorination of iron-titanium bearing material in a bed of said material having a vapor space above the bed while maintaining the temperature of the bed above 800° C. and withdrawing chloride vapors from the bed into said vapor space, the improvement which comprises maintaining the temperature of a portion of the vapor space above and spaced from the upper level of the bed below the temperature at which ferrous chloride is solid by introducing into said vapor space and into contact with the chloride vapors therein a metal halide in unvaporized state which vaporizes in contact with said chloride vapors thereby forming a solid suspension of ferrous chloride in the vapor and removing the suspension from the reactor.

6. In the chlorination of iron-titanium bearing material in a bed of said material having a vapor space above the bed while maintaining the temperature of the bed above 800° C. and withdrawing chloride vapors from the bed into said vapor space, the improvement which comprises maintaining the temperature of a portion of the vapor space above and spaced from the upper level of the bed below the temperature at which ferrous chloride is solid by introducing liquid titanium tetrachloride into said vapor space and into contact with the chloride vapors, and vaporizing said liquid titanium tetrachloride whereby to cool the cholride vapors thereby forming a solid suspension of ferrous chloride in the vapor and removing the suspension from the reactor.

7. In the chlorination of iron-titanium bearing material in a bed of said material having a vapor space above the bed while maintaining the temperature of the bed above 800° C. and withdrawing chloride vapors from the bed into said vapor space, the improvement which comprises maintaining the temperature of a portion of the vapor space above and spaced from the upper level of the bed below the temperature at which ferrous chloride is solid by introducing solid iron chloride into said vapor space and into contact with the chloride vapors, and vaporizing said solid iron chloride whereby to cool the chloride vapors thereby forming a solid suspension of ferrous chloride in the vapor and removing the suspension from the reactor.

8. A method of treating iron-titanium bearing materials which comprises establishing a bed of the material in a reactor, said bed having a vapor space above the top level thereof, introducing chlorine into the bed while maintaining the temperature of the bed high enough to cause chlorination of the iron-titanium bearing material, maintaining the rate of introduction of the chlorine into the bed low enough to ensure production of ferrous chloride in vapor state and titanium tetrachloride, removing the resulting ferrous chloride and titanium tetrachloride vapor from the surface of the bed and maintaining the temperature of a portion of the vapor space above the bed below the temperature at which ferrous chloride is solid but high enough to maintain the titanium tetrachloride in vapor state, and passing the vapors removed from the bed through said portion of the vapor space whereby ferrous chloride is rapidly converted to solid state, said portion being spaced from the upper level of the bed to thereby form a solid suspension within the vapors and removing the resulting suspension from the reactor.

9. The process of claim 8 wherein the vapor space which is maintained at a temperature at which ferrous chloride is solid is at least one-half to 3 feet above the level of the bed.

10. The process of claim 9 wherein the temperature of said vapor space is below 500° C. but above 200° C.

11. A method of treating iron-titanium bearing materials which comprises establishing a bed of the material in a reactor having a vapor space above the top level of the bed, introducing chlorine into the bed while maintaining the temperature of the bed high enough to cause chlorination of the iron-titanium bearing material, maintaining the rate of introduction of the chlorine into the bed low enough to insure production of ferrous chloride in vapor state and titanium tetrachloride, removing the resulting ferrous chloride and titanium tetrachloride vapor from the surface of the bed and maintaining the temperature of a portion of the vapor space extending across the path of the removed vapors below the temperature at which ferrous chloride is solid but high enough to maintain the titanium tetrachloride in vapor state, passing the vapors removed from the bed through said portion of the vapor space, cooling the vapors as they pass through said portion rapidly enough to convert the ferrous chloride vapors to a solid and to form a solid suspension within the vapors, and removing the resulting suspension from the reactor, said portion being spaced from the upper level of the bed.

12. In a method of treating a vapor mixture comprising ferrous chloride and titanium tetrachloride produced by chlorinating a bed of iron-titanium bearing material in a reactor having a gas space above the surface of the bed, the improvement which comprises removing the vapor mixture from the surface of the bed, maintaining the temperature of a portion of the gas space extending across the path of flow of the removed mixture below the temperature at which ferrous chloride is solid but high enough to maintain the titanium tetrachloride in vapor state, passing the vapor mixture through said portion, cooling the vapors as they pass through said portion rapidly enough to convert ferrous chloride vapors to solid particles to thereby form a solid suspension within the gases, and removing the resulting suspension from the reactor, said portion being spaced from the upper level of the bed.

References Cited in the file of this patent

UNITED STATES PATENTS

| 2,849,083 | Nelson et al. | Aug. 26, 1958 |
| 2,868,622 | Bennett et al. | Jan. 13, 1959 |

FOREIGN PATENTS

| 762,583 | Great Britain | Nov. 28, 1956 |